(No Model.)
G. R. PLATT.
SEED AND FERTILIZER DISTRIBUTER.
No. 268,279. Patented Nov. 28, 1882.
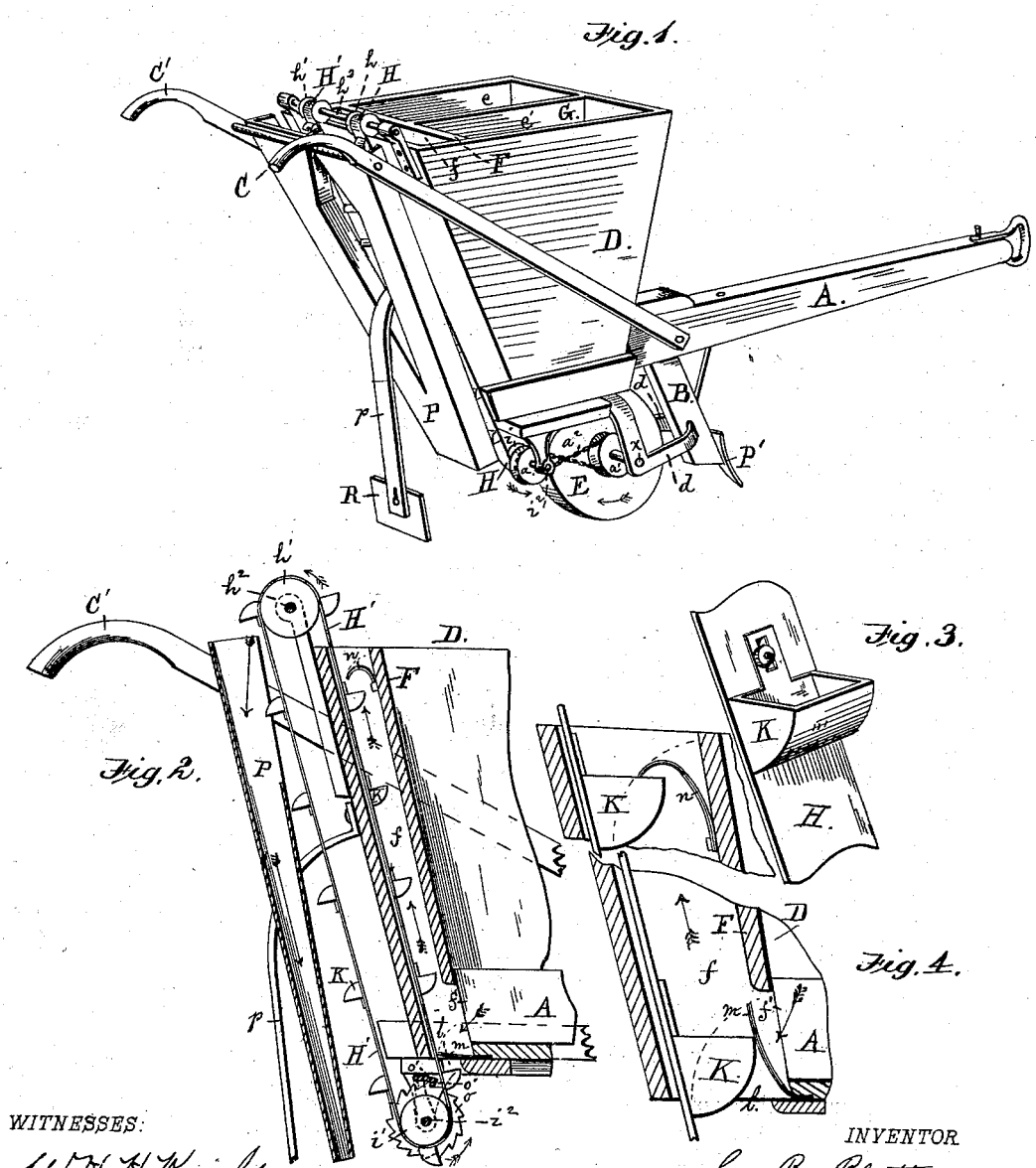

UNITED STATES PATENT OFFICE.

GEORGE R. PLATT, OF GRETNA, LOUISIANA.

SEED AND FERTILIZER DISTRIBUTER.

SPECIFICATION forming part of Letters Patent No. 268,279, dated November 28, 1882.

Application filed July 25, 1882. (No model.)

*To all whom it may concern:*

Be it known that I, GEORGE RICHARD PLATT, a resident of the town of Gretna, parish of Jefferson, and State of Louisiana, have invented a certain new and useful Improvement in Seed and Fertilizer Distributers; and I do hereby declare the following to be a full, clear, and correct description of the same, reference being had to the annexed drawings, making a part of this specification.

On the drawings, Figure 1 represents a perspective view of my machine complete. Fig. 2 is a vertical longitudinal section of a portion of the hopper and rear part of the machine. Fig. 3 is a perspective view of one of my elevating-cups, with portion of the band to which it is attached; and Fig. 4 is enlarged views of the band-chamber and parts connected therewith.

My invention relates to that class of seed planters and distributers which are provided with the ordinary beam, standard, and handles of a plow. This machine will drop potatoes or seeds and distribute all kinds of fertilizers.

My invention consists in a hopper having separate receptacles for seed and fertilizers and a chamber in which is operated a pair of endless bands, said bands provided with adjustable elevating-cups, for purposes hereinafter specified. The partition which divides the band-chamber from the aforesaid receptacles has openings at the bottom thereof, through which the seed and fertilizers automatically pass to the elevating-cups. The bands operate over pulleys at the top and bottom of the hopper and upwardly through holes in the bottom of the band-chamber. These holes are covered with elastic brushes or plates, which yield to the pressure of the cups and fly back to their normal positions immediately after the passage of the same, thereby preventing any waste or escape of material. At the rear of the band-chamber is a bifurcated tube, into which the seed and fertilizer are dropped and conducted into the furrow which is made by the plow point or opener. An adjustable scraper is fitted in rear of this tube, so as to vary the amount of covering to suit the material dropped. Motion is imparted to the bands from a ground-wheel, which operates in rear of the opener, and which has a pulley secured to its side or on its shaft, said pulley connected by a crossed chain or band with a similar pulley on the lower shaft of the aforesaid bands. This shaft is provided with a ratchet-wheel, above which is fitted a pawl for locking the bands when the machine is moved backward.

On the drawings, A is the beam; B, the standard, and C C' the handles, all of which are similar to those of an ordinary plow.

D is the hopper, which is secured to the rear end of the beam in any desired manner. On the drawings the said end of the beam is represented as abutting the rear partition of the hopper, having been passed through a hole in the front of same. Side braces or supports, $d$, connect the bottom of the said hopper with the standard. These braces also serve as bearings for the shaft $x$, on which the ground-roller E is fitted.

F is a partition, which is made in the rear of the hopper, so as to form the band-chamber $f$. This partition is provided with openings $f'$, through which the seeds and fertilizers pass to the cups K; and G is a vertical longitudinal partition, whereby the forward part of the hopper is divided in two receptacles, $e\ e'$—one for seeds and the other for fertilizers—as before mentioned.

H H' are endless bands, which operate over pulleys $h\ h'\ i\ i'$—the two former fitted on a shaft, $h^2$, having bearings at the top of the hopper, and the two latter on a shaft, $i^2$, at the bottom of the same.

K are the elevating-buckets, having slotted projections at the backs thereof, so that they may be adjustably held on the bands by means of bolts, as shown at Fig. 3. The lower band-shaft, $i^2$, and the ground-wheel shaft $x$ are each provided with a pulley, $a\ a'$, over which a crossed chain or belt, $a^2$, operates, so as to transmit motion from the ground-wheel to the bands.

The aforesaid band-shaft is furthermore provided with a ratchet-wheel, $o$, which is so fitted as to be locked by a pawl, $o'$, when the machine is moved other than in a forward direction.

In the bottom of the band-chamber is an opening, $l$, through which the band passes in its upward course. This opening is covered by an elastic brush or plate, $m$.

The letter $m$ designates the upper brush or scraper, which is secured inside of the band-chamber, and serves to level the material within the cups even with the upper edges thereof. Different-sized cups may be used to suit the different kinds of seed or material employed.

P is the bifurcated tube, into which the seed, &c., are discharged from the cups; and R is a scraper, which is secured by any desired means to the lower slotted end of a rear projected standard, p.

Having thus described my invention, what I claim as new, and desire to secure by Letters Patent, is—

In combination with the hopper D and the elevating-cup bands, arranged for operation as herein shown and described, the bifurcated tube P, substantially as and for the purpose set forth.

In testimony whereof I affix my signature in presence of two witnesses.

GEORGE RICHARD PLATT.

Witnesses:
P. J. FINNEY,
J. C. HUBBELL.